March 6, 1951  L. T. McGEE  2,543,796

HYDRAULIC PUMP

Filed April 18, 1949

INVENTOR,
Leland T. McGee
BY
ATTORNEY.

Patented Mar. 6, 1951

2,543,796

UNITED STATES PATENT OFFICE 2,543,796

HYDRAULIC PUMP

Leland T. McGee, Los Angeles, Calif.

Application April 18, 1949, Serial No. 88,185

12 Claims. (Cl. 103—174)

This invention relates to hydraulic pumps, and more particularly to the type of hydraulic pump which is used for pumping hydraulic fluid from a source of supply to power cylinders for moving various kinds of scrapers, shovels, and other power-operated members or mechanisms.

Among the salient objects of the invention are: to provide a simple, compact, efficient and economical hydraulic pump which can be connected with any suitable source of hydraulic fluid for pumping it into power cylinders at various locations; to provide a hydraulic pump in which a steel ball operates in a cylinder as a piston, to be moved in one direction by a moving cam member, and to be returned by a coiled spring in the cylinder behind said ball; to provide a construction and arrangement wherein a plurality of radially disposed cylinders each has in its inner end a steel ball, to function therein as a piston, with a revoluble eccentric cam member, common to all, to successively move said steel balls into said cylinders, with a coiled spring in each cylinder, behind its ball, to return it to the mouth of said cylinder, the movement of each ball back and forth in its cylinder functioning as a piston therein for pumping power fluid.

In order to explain my invention, I have illustrated the same on the accompanying sheet of drawings, in which.

Referring now in detail to the drawings, my invention as here shown for illustrative purposes, includes a body casting 5, having a series of radial bores 6 therein, with the inner portion of each thereof of less diameter, as at 6', said casting also having a hub-like part, as 7, forming a threaded inlet connection at 8, for connecting a source of hydraulic fluid to said casting, and to the chamber 9, formed in the central part thereof.

Figure 1:
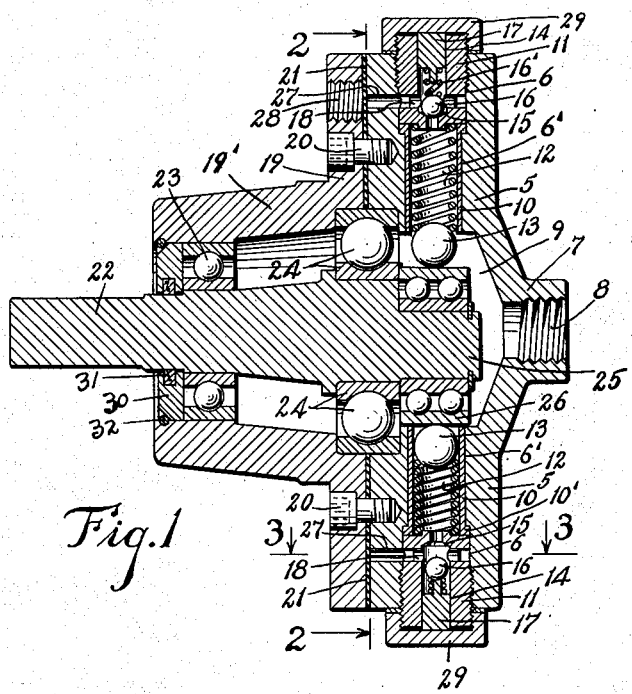
Figure 1 is a central sectional view through a hydraulic pump embodying my invention, taken on line 1—1 on Fig. 2.
Figure 3:
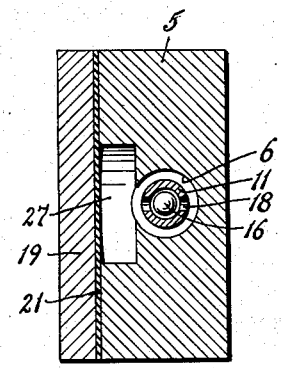
Figure 3 is a sectional view taken on line 3—3 of Fig. 1, and also on Fig. 2.

Mounted in each of the radial bores 6' is a lining member 10, having an annular flange-like part 10' at its end and which supports said lining on the shoulder formed at the juncture of the two sizes of bores 6 and 6', as clearly shown in Fig. 1.

Secured to the outer or larger bore 6 of each bore is an externally threaded member 11, the inner end of which seats on the upper end of said lining member 10—10', as shown, and it also has a short central extension seated in the upper end of a coiled spring 12 in said lining member 10, said spring at its inner end being seated upon a steel ball 13, which fits into the end of said lining member 10, as shown in Fig. 1.

The member 11, in the outer end of the bore 6, has a central bore 14 therethrough, the inner end of which is reduced to form a valve seat 15 for a ball check valve 16, and bearing on which is a small coiled spring 16', the upper end of which receives the reduced end of a member 17. Said member 11 also has a transverse bore 18 therethrough which intersects the bore 14 in said member, near the ball valve seat 15.

Mounted on the opposite side of said main body casting 5 is a casting 19, having a hub-like portion 19', and secured to said main casting 5 by means of screw bolts 20, 20, with a gasket 21 therebetween.

A drive shaft 22 is shown mounted through said casting 19, with ball bearings at 23 and 24. The inner end of said shaft has an eccentric or throw bearing member 25, with a ball bearing contact collar 26 thereon, and positioned to operate the steel ball pistons 13, 13, in their respective cylinders, as said shaft is driven. This eccentric with its ball bearing collar operates in the chamber 9 formed in said main casting, as shown.

Figure 2:
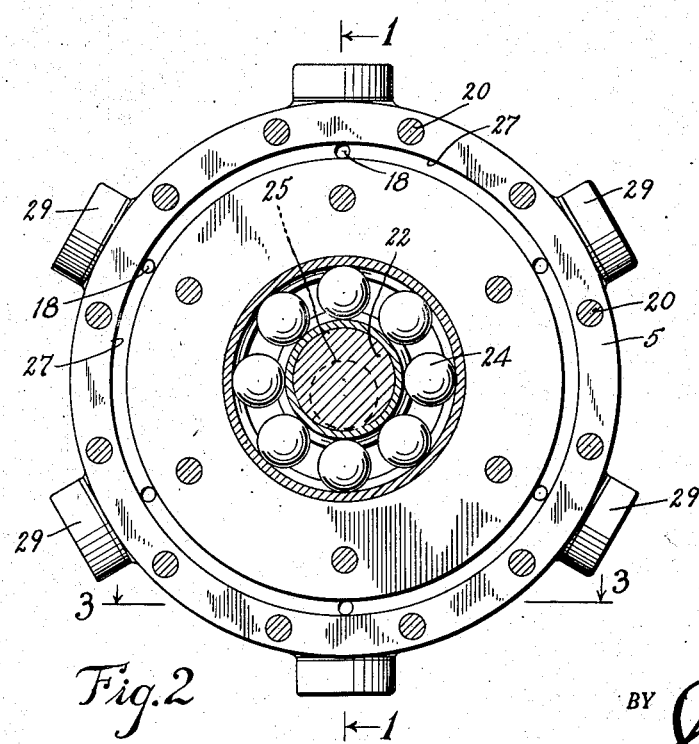
Figure 2 is a sectional view taken on line 2—2 on Fig. 1.

Said body casting 5 has a narrow annular chamber 27 formed therein and connecting with the transverse bores 18, 18, through the members 11, in the radial bores 6—6', as will be understood from Figs. 1 and 2. Said annular chamber 27 communicates with an outlet or discharge connection 28, internally threaded to receive a discharge pipe to be connected therewith, but not shown.

Each of the threaded insert members 11, 11, is provided on its outer end with a cap, as 29.

In the open end of the hub-like portion 19' of casting 19, I have shown a closure member 30, around the shaft 22, with a gasket 31, and a snap retaining ring 32. Any suitable retaining or closure member can be used for this purpose.

Use and operation

The use and operation of the invention may be briefly described as follows:

Assuming that the body of said pump is filled with the fluid being pumped, as a ball 13 is moved out of the cylinder 6' by its spring 12, as seen in the upper cylinder, Fig. 1, and the ball valve 16 in the discharge end of said cylinder is closed, sufficient vacuum tendency has been created within said cylinder by the outward movement of said steel ball, to cause fluid from chamber 9 to flow into said cylinder. As said ball is forced into the cylinder by the eccentric or throw member 25 and its ball bearing contact collar, said fluid is forced through the ball valve 16 and into the annular chamber 27, and to the outlet 28. This action has just taken place in the lower cylinder, Fig. 1.

All six cylinders, with their steel ball pistons function in this manner successively as said drive shaft 22 and said eccentric throw bearing member are revolved, thus drawing in and forcing hydraulic fluid into the outer annular chamber 27. It should be understood that this mechanism functions at a high rate of speed, as high as 2500 R. P. M.

A working model has been operated at that speed.

The vacuum tendency which is created in each cylinder, as its steel ball is moved by its spring to and slightly out of the mouth of its cylinder, causes the inflow of the fluid into said pump and to said cylinder, ball valve 16 being closed at the initial movement of said ball from its position as shown in the lower cylinder in Fig. 1, toward the position shown in the upper cylinder.

I do not limit the invention to the details shown for illustrative purposes, except as I may be limited by the hereto appended claims.

I claim:

1. In a hydraulic pump: a body having a fluid chamber therein with means for connecting it with a source of operating fluid, a cylinder having its intake end open in said chamber and having a check valve at its discharge end to permit discharge of fluid therethrough and prevent back flow thereof, a ball in said cylinder to function as a piston, a spring in said cylinder behind said ball for yieldingly moving it to and through the open intake end of said cylinder, an operating member near the intake end of said cylinder and in operating engagement with said ball for intermittently moving it into said cylinder as a piston for forcing fluid through said check valve at the discharge end of said cylinder, power means for moving said operating member to intermittently move said ball into said cylinder as a piston, and means for connecting a pipe with the discharge end of said cylinder for conveying said fluid under pressure to a place of use.

2. In a hydraulic pump: a body having a fluid chamber therein with means for connecting it with a source of operating fluid, a plurality of radially disposed cylinders in said body with their intake ends opening into said chamber, said cylinders having check valves in their discharge ends, a ball in each of said cylinders to function as a piston, a spring in each of said cylinders behind its ball to move it to and through the open intake end of said cylinder, an operating member in said chamber, common to all of said cylinders, and operable for successively engaging and moving said balls into said cylinders as pistons for forcing fluid through said check valves in the discharge ends of said cylinders, power means for driving said operating member to intermittently move said balls as pistons, and means for connecting a pipe with the discharge of said cylinders for carrying said fluid under pressure to a place of use.

3. In a hydraulic pump: a body having a fluid chamber therein with means for connecting it with a source of operating fluid, a cylinder having its intake end open in said chamber and having a check valve at its discharge end to permit discharge of fluid therethrough and prevent back flow thereof, a lining member in said cylinder, a ball in said cylinder to function as a piston in said lining member, a spring in said lining member behind said ball for yieldingly moving it to and through the open intake end of said lining member and said cylinder, an operating member near the end of said cylinder in said chamber and in operating engagement with said ball for moving it, power means for moving said operating member to intermittently move said ball into said cylinder as a piston, and means for connecting a pipe with the discharge end of said cylinder for conveying said fluid under pressure to a place of use.

4. In a hydraulic pump: a body having a fluid chamber therein, with means for connecting it with a source of operating fluid, a plurality of cylinders in said body, radially disposed with their open intake ends in said chamber, said cylinders having check valves in their discharge ends, a lining member in each of said cylinders, a ball in each of said lining members to function as a piston therein, a spring in each of said lining members behind its ball for yieldingly moving it to and through the open intake end thereof, an operating member in said chamber, common to all of said cylinders, and operable for successively moving said balls into said cylinders as pistons for forcing fluid through said check valves in the discharge ends of said cylinders, power means for driving said operating member to intermittently and successively move said balls as pistons into their respective cylinders, and means for connecting said cylinders with a pipe for carrying said fluid under pressure to a place of use.

5. In a hydraulic pump: a body having a fluid chamber therein with means for connecting a source of operating fluid thereto, a plurality of cylinders in said body having their intake ends opening into said chamber and having check valves in their discharge ends, with a discharge chamber formed in said body common to all of said cylinders, means for pipe connection from said discharge chamber to carry fluid under pressure therefrom to a place of use, a ball in each of said cylinders to function as a piston therein, a spring in each of said cylinders behind its ball to move it to and through the open intake end of said cylinder, an operating member in said chamber, common to all of said cylinders, and operable for successively moving said balls into said cylinders as pistons for forcing fluid through said check valves and into said discharge chamber, and power means for driving said operating member.

6. A hydraulic pump including a body having a plurality of cylinders formed therein, in radial relationship to each other, with a fluid chamber therein common to the inner ends of said cylinders, said cylinders having check valves in their outer ends connecting said cylinders with a service pipe for carrying fluid under pressure to a place of use, a ball in each of said cylinders to function as a piston, a spring in each cylinder behind its ball for moving said ball to and through the intake end of said cylinder, an operating member in said chamber having an eccentric bearing member with a ball-engaging member thereon common to all of said balls, and operable to successively move said balls into said cylinders as pistons to force fluid out through said check valves and to said service pipe, and power means for driving said operating member to successively move said balls into their respective cylinders as pistons, in the manner described.

7. In a pumping mechanism, a body having a fluid chamber therein with means for connecting a source of fluid thereto, a cylinder in said body having its intake end open in said fluid chamber to receive fluid therefrom, and having a check valve in its discharge end, with means for connecting a service pipe thereto, a ball in said cylinder operable as a piston therein, a spring in said cylinder behind said ball for moving it to and through the intake end thereof to permit inflow of fluid into said cylinder around said ball from said fluid chamber, and an operating member operable on said ball for intermittently moving it into said cylinder to function as a piston for forcing fluid in said cylinder out through its check valve to said service pipe.

8. In a pumping mechanism, a body having a fluid chamber formed therein with means for connecting a source of fluid thereto, a plurality of cylinders in said body having their intake ends open in said fluid chamber to receive fluid therefrom, and having check valves in their discharge ends, with means for connecting a service pipe to receive fluid under pressure through said check valves, a ball in each cylinder operable as a piston therein, a spring in each cylinder behind its ball for moving said ball to and through the intake end of said cylinder to permit fluid to flow into said cylinder around said ball from said fluid chamber, and an operating member operable on said balls for intermittently moving them into said cylinders to function as pistons therein for forcing fluid therefrom out through said check valves to said service pipe, and power means for driving said operating member.

9. In a pumping mechanism having intake and discharge connections, the combination with the cylinder thereof of a ball operable therein as a piston and movable to a position outside of said cylinder to open the intake end for inflow of fluid, and spring means for moving said ball to said open position through the end of said cylinder, and operating means for moving said ball into said cylinder to function as a piston.

10. In a pumping mechanism having a pump cylinder with intake and discharge connections, a ball in said cylinder to function as a piston therein, said ball being movable to a position in the intake of said cylinder outside of said cylinder to open said intake, spring means for moving said ball to said outside position, and an operating member, with means for driving it, for intermittently moving said ball into said cylinder to function as a piston.

11. In a pump cylinder having intake and discharge connections, a ball therein to function as a piston, a spring in said cylinder and operable on said ball to move it outside of said cylinder and to hold it in alinement therewith, to open said intake, and an operating member operable on said ball to intermittently move it into said cylinder to function as a piston, and means for operating said member.

12. In a pumping mechanism, a cylinder with intake end and discharge connections for pumping fluid, a ball in said cylinder to function as a piston therein, said ball being movable to and through the intake of said cylinder, to a position outside thereof, to permit inflow of fluid into said cylinder, a coiled spring in said cylinder in moving and holding engagement with said ball for moving it outside of said intake to permit inflow, and an operating member operable for intermittently moving said ball back into said cylinder to function as a piston.

LELAND T. McGEE.

No references cited.